United States Patent

[11] 3,633,518

| [72] | Inventor | Edwin Charles Simmonds<br>Wellesbourne, Warwick, England |
|---|---|---|
| [21] | Appl. No. | 849,653 |
| [22] | Filed | Aug. 13, 1969 |
| [45] | Patented | Jan. 11, 1972 |
| [73] | Assignee | Charles Simmonds and Trimcote Limited<br>Warwick, England |
| [32] | Priority | Aug. 28, 1968 |
| [33] | | Great Britain |
| [31] | | 41,037/68 |

[54] OVENS
14 Claims, 10 Drawing Figs.

[52] U.S. Cl............................................... 107/55 R
[51] Int. Cl................................................ A21b 1/00
[50] Field of Search.......................................... 34/130–132;
107/57, 56, 57 A, 57 D, 55

[56] References Cited
UNITED STATES PATENTS

| 205,399 | 6/1878 | Knapp............................ | 34/130 |
| 870,133 | 11/1907 | Sargent........................... | 34/223 |
| 1,700,994 | 2/1929 | Buck............................... | 34/223 |
| 3,445,939 | 5/1969 | Malmquist...................... | 34/223 |

FOREIGN PATENTS

| 724,133 | 1955 | Great Britain................ | 34/132 |

Primary Examiner—John E. Murtagh
Attorney—William Anthony Drucker

ABSTRACT: The invention relates to an oven for heating or baking products by circulation of hot air having means which conduct heated air into the product space of the oven in currents from opposite sides of said space, and each such current of air is directed from one side towards the opposite side from an opening in said means which moves in an endless path.

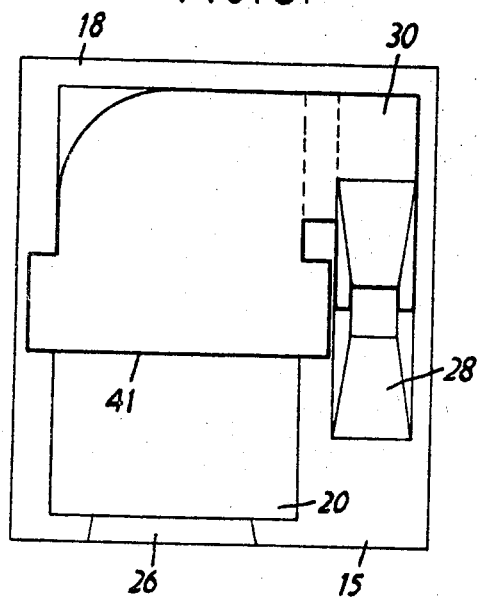
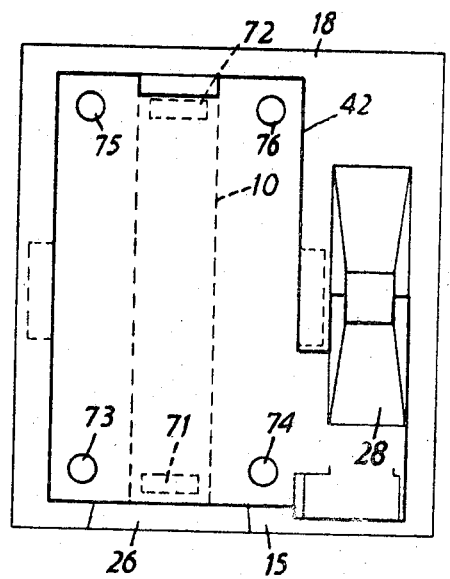
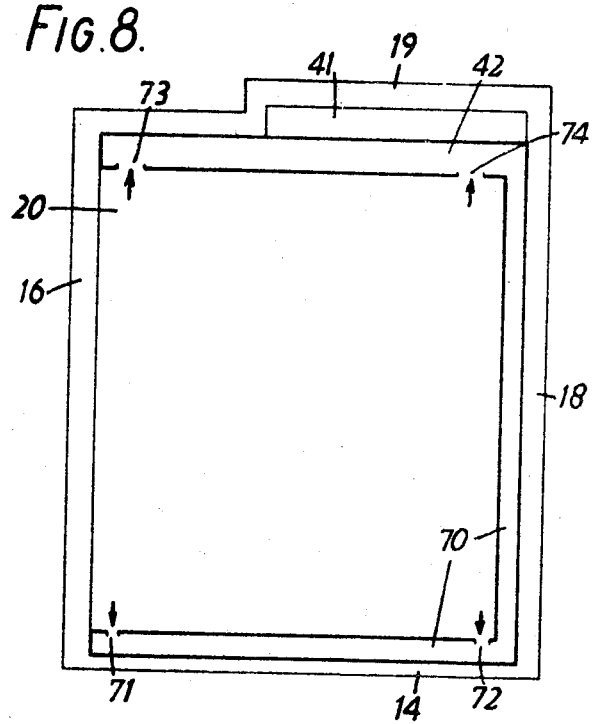

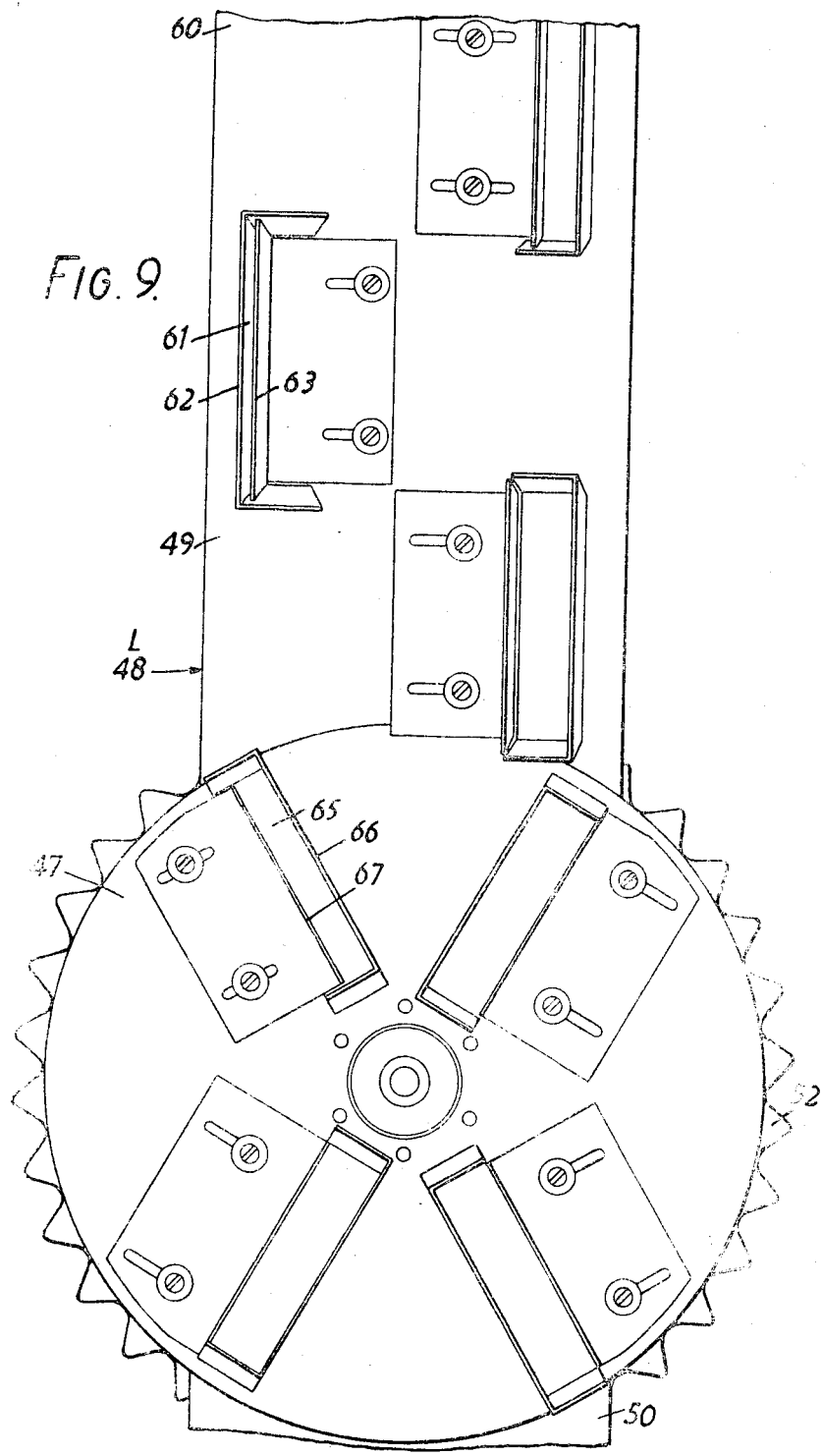

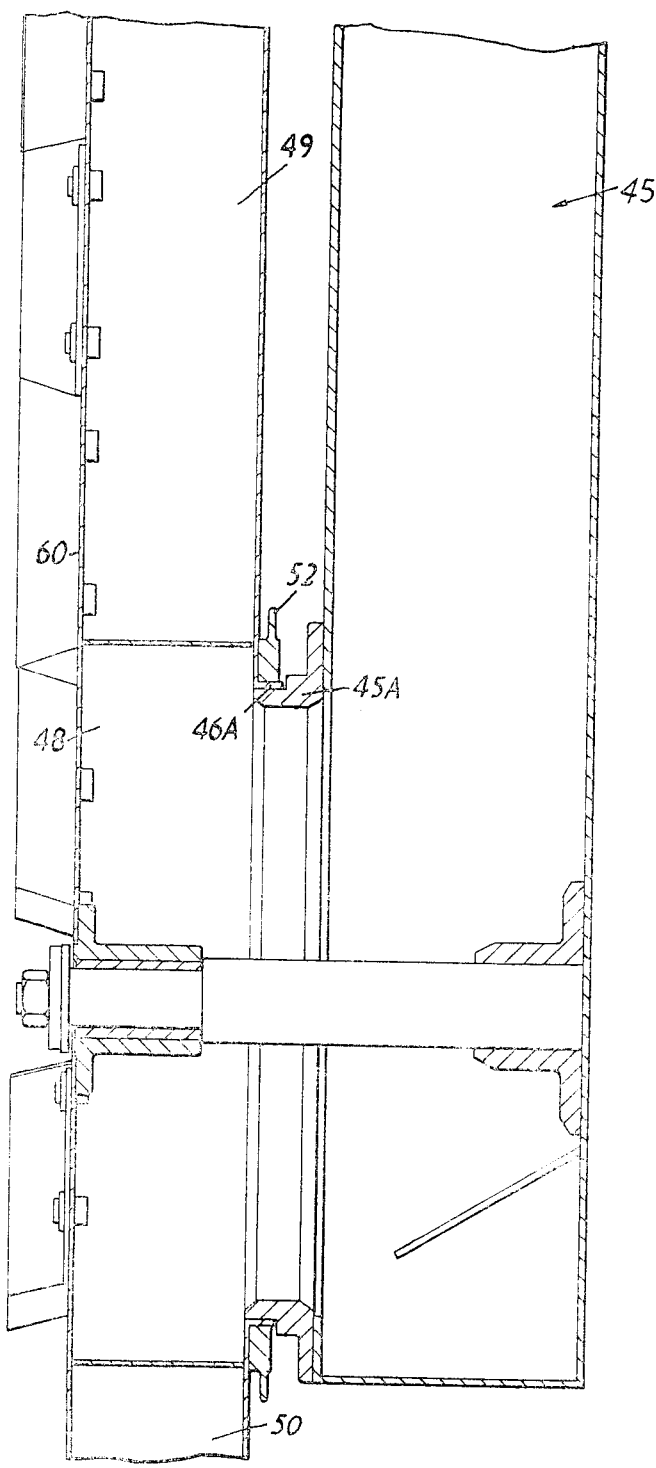

OVENS

This invention relates to ovens in which products are heated or baked by circulation of hot air. The invention may be applied to baking edible bakery products or to reheating food or heating of other products.

Ovens are known which have a baking chamber into which may be wheeled a rack comprising a mobile framework supporting a number of trays filled with goods to be baked.

The main problem with such ovens is to obtain the same degree of baking on all parts of each product over the whole of the rack. Some complicated constructions have been proposed for this purpose, such as providing means for automatically moving the rack in a rotary or reciprocating motion during baking and this is not only mechanically complicated but also generally requires the precise locating of a heavy load of products at a certain point: it may also require the load to be locked in position, such actions being difficult and even dangerous for an operator working within the high temperatures required for baking.

There are further disadvantages where the load is rotated or moved in reciprocating action inside the oven, particularly in the case of goods holding liquids; also, in certain instances, complicated means are employed to control the flow of heated air.

The purpose of the present invention is to provide an oven in which the flow of the heated air is arranged to pass around all sides of the goods to be baked and in which the rack containing the goods is stationary during the baking process.

According to the present invention means are provided which conduct heated air into the product space of the oven in currents from opposite sides of said space, and each such current of air is directed from one side towards the opposite side from an opening in said means which moves in an endless path.

Said openings may be in hollow rotors so that the endless path is a circle.

Preferably, the openings on one side of the product space are offset from those on the other side so that each part of the goods receives a current of air from one side followed by a current of air from the opposite side.

In a particular construction the rotors on each side are two arms diametrically in line offset 90° from the arms on the other side.

A constructional form of the invention will now be described with reference to the accompanying diagrammatic drawings where:

FIGS. 6 and 7 are plan views of heated air chambers at the upper part of the oven;

FIG. 8 is a vertical section showing the return air collection system;

FIG. 9 is an elevational view of a rotor; and

FIG. 10 is a sectional view of the rotor of FIG. 9 with adjacent duct.

Figure 1:
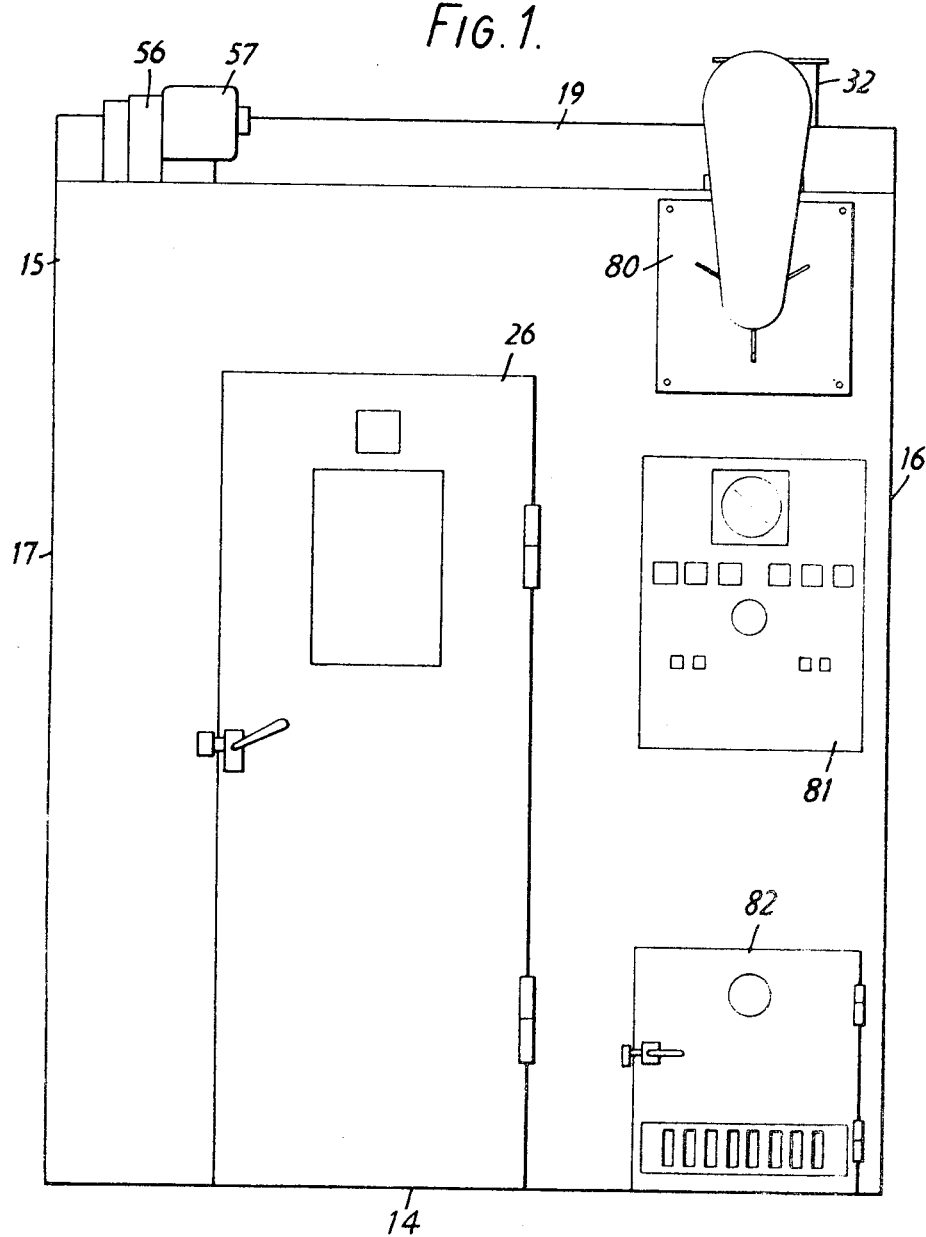
FIG. 1 is a front elevation of an oven made in accordance with the invention.
Figure 2:
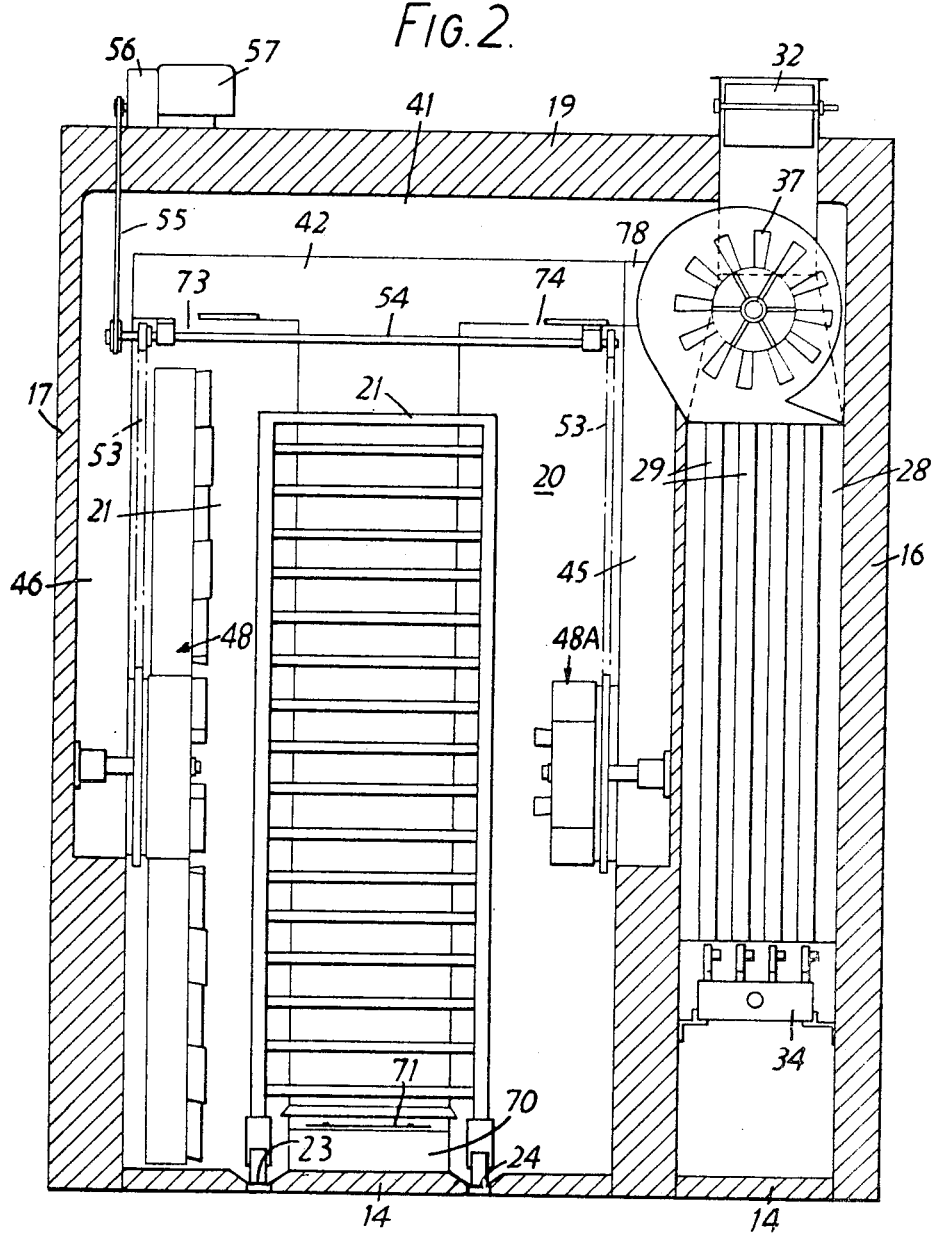
FIG. 2 is a front elevation thereof with the front wall removed to show the location of a heat exchanger fan and duct systems.

The oven has a floor 14, a front wall 15, sidewalls 16, 17, rear wall 18 and top 19 enclosing an oven space 20 into which two trolleys 21, 22 can be wheeled on rails 23, 24 (FIG. 2). The trolleys carry racks on which trays are placed carrying the products to be baked. The front wall has a door 26.

Figure 3:
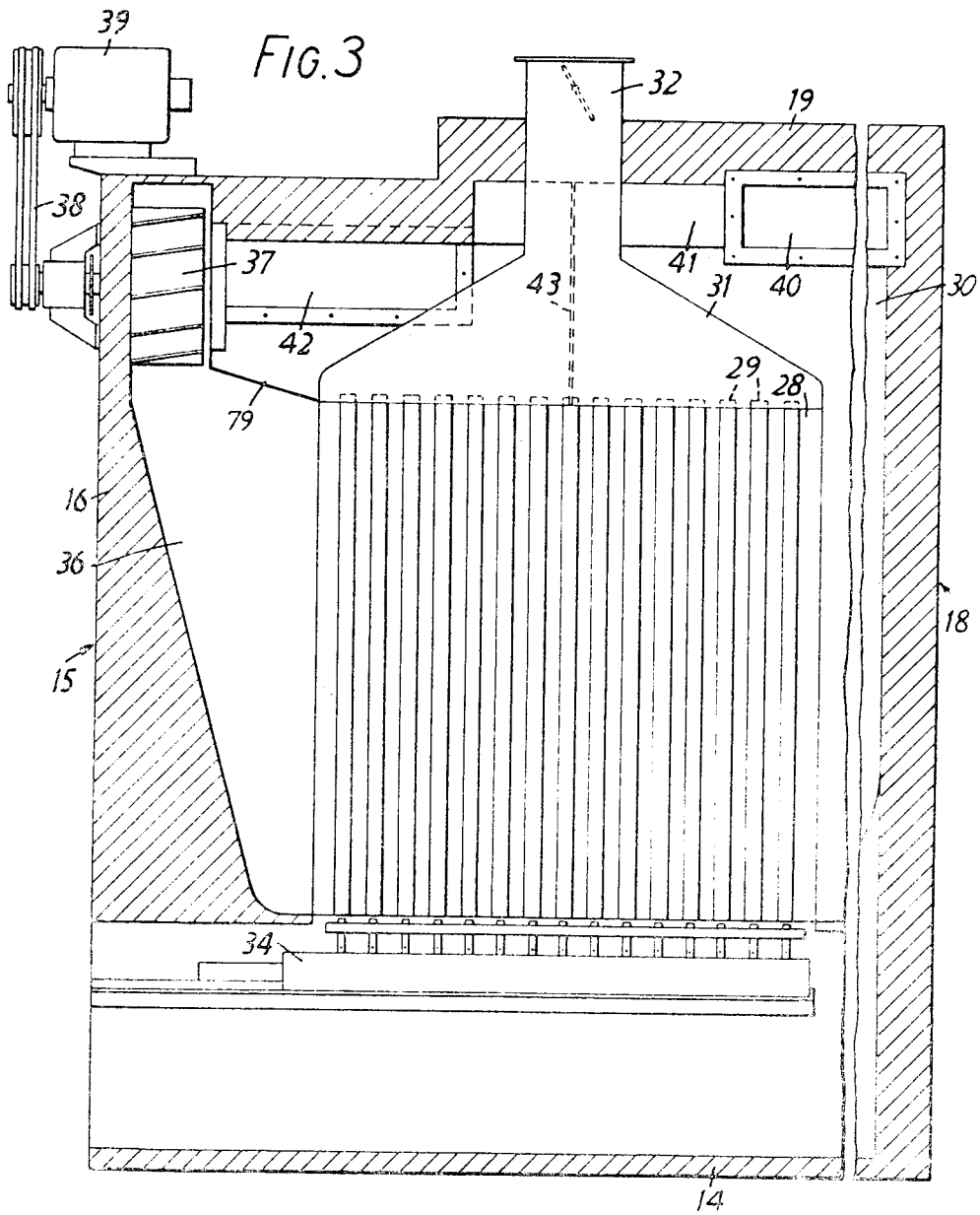
FIG. 3 is a side elevation with a sidewall removed to show air passages through the heat exchanger.
Figure 4:
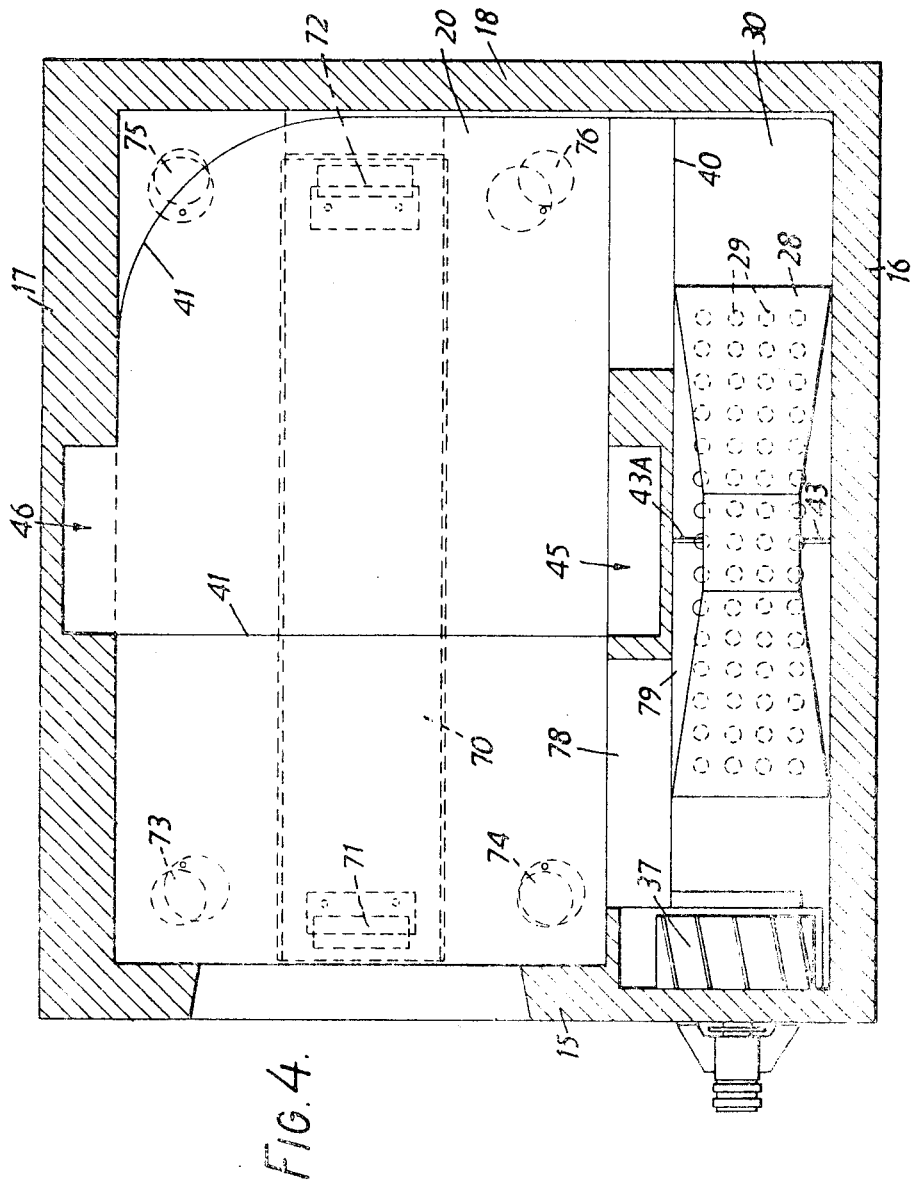
FIG. 4 is a plan view with the top removed.

On one side of the oven and located therein is a heat exchanger comprising a chamber 28 containing a stack of tubes 29 disposed in a vertical direction. The rear of the chamber 28 communicates directly with a duct 30 (FIG. 3). The front of chamber 28 communicates by duct 36 with the outlet of a fan 37 driven by belting 38 and motor 39. The top of chamber 28 communicates with an exhaust collector cone 31 and chimney 32. A burner 34 discharges flame direct into each of the tubes 29 of the heat exchanger and the hot gases pass through the tubes 29 and exit to exhaust cone 31 and chimney 32.

Air is circulated through the chamber 28 and passes into duct 30 whence it passes over the heated rear side of exhaust cone 24 and chimney 25 and thence through an opening 40 into a hot air chamber 41.

The rear part of the space above the cone 31 is divided from the front part of said space by walls 43, 43A.

The chamber 41 is a flat-shaped chamber at the top of the oven having the shape shown in heavy lines in FIG. 6. Immediately below the chamber 41 is another flat hot air chamber 42 having the shape shown in heavy lines in FIG. 7.

From chamber 41 the air passes into two outwardly and downwardly extending ducts 45, 46 one each side of the oven. These ducts carry rotors 48, 48A which discharge the air back into the oven space 20.

One of the ducts and its rotor will now be described, the other limb and its rotor being similar.

Figure 5:
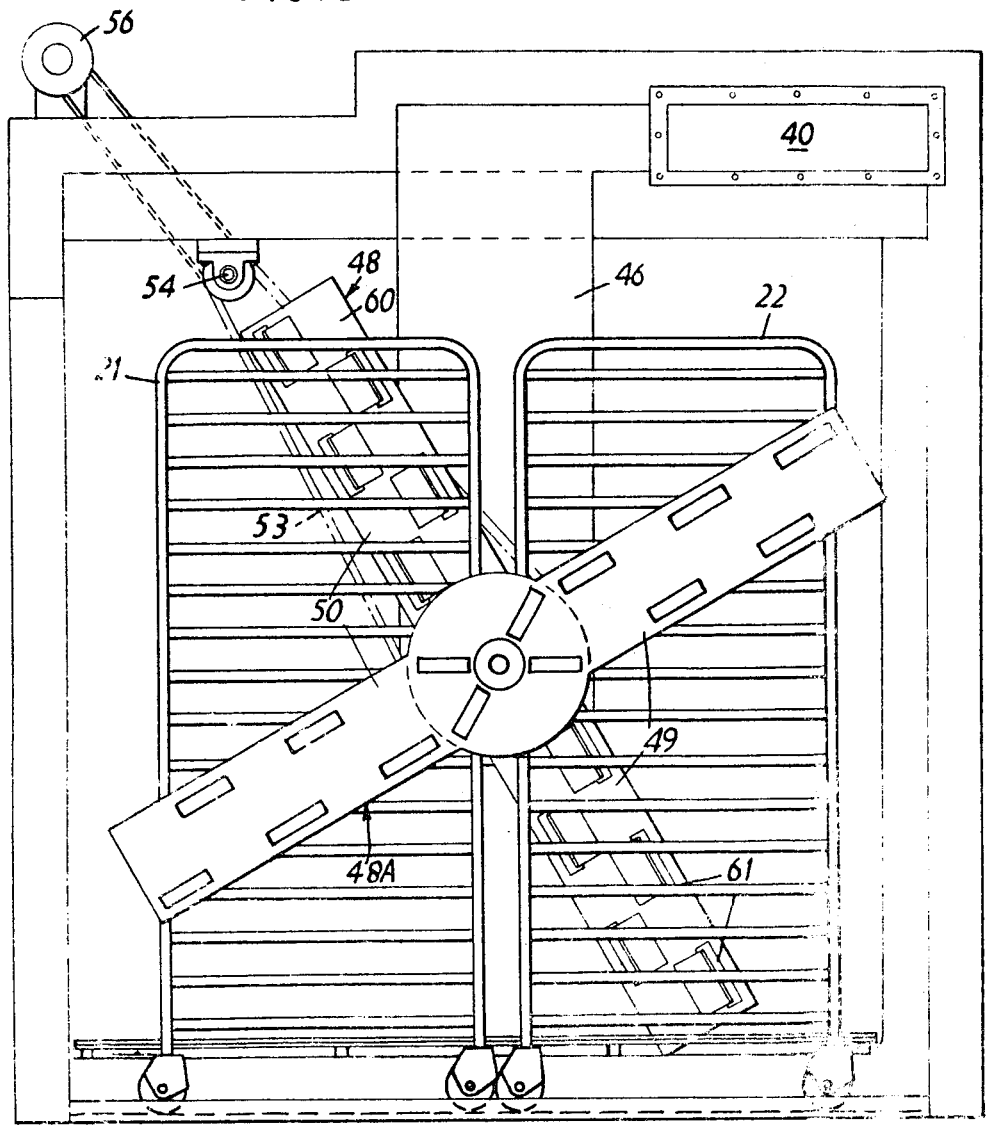
FIG. 5 is a side view of two rotors and ducting thereto.

The lower end of the duct 45 has a circular opening to the circular margin of which is fixed a rim 45A (FIG. 10) which serves as a bearing for a flange 46A on a hollow rotor member which has a central circular part 47 and two radial arms 49, 50 in line diametrically with each other. Fixed on the flange 46A is a sprocket 52 driven by a chain 53 (FIG. 5) from an axle 54 which, in turn, is driven by chain 55 from a reduction gear 56 driven by an electric motor 57. The inner wall 60 of the rotor is provided with radially disposed air discharge openings 61 which overlap radially and each of which is provided with a fixed control flange 62 and an adjustable control flange 63. The flanges 62, 63 have their lips at suitable angles, e.g., 70°–80° to the vertical plane of the wall 60. The lips thus provide discharge nozzles in the form of slits.

The circular part 48 of the rotor also has four slotlike openings 65 about radial to the circle and provided by similar flanges 66, 67.

The openings 61, 65 thus cover substantially the whole area of the side of the baking space 20 as they rotate.

The rotors 48, 48A are offset at 90° (FIG. 5) from each other so that each part of the stack of products being baked receives hot air first from one side and then from the other.

If desired more rotors, or rotors with more arms, may be provided or the rotors could be complete discs.

The openings on each side move in circular paths and direct currents of air towards the other side so that the currents achieve a swirling or vortex movement. Each current of air moves from one side towards the other side but at an angle to the horizontal.

The air leaves the lower part of the oven space 20 by an L-shaped duct 70, the lower part of which is on the floor of the oven front to back thereof and has adjustable intake slots 71 and 72 at opposite ends. The duct has a vertical part leading into the chamber 42. The air leaves the upper part of the oven space through four openings 73, 74, 75, 76 at each corner respectively of the floor of the air chamber 42. The air leaves chamber 42 through a duct 78 and enters the front part or duct 79 of the space over the cone 31 and thence by the fan 37 into duct 36. Air from duct 36 passes through the heat exchanger and the reheated air is recirculated via the rotors into the oven.

While the openings 61, 65 move in a circular endless path it is also possible to conduct the openings through elliptical or other endless paths by hollow flexible conductors. The rotors are driven in the same direction but could, if desired, be driven in opposite directions.

An access opening covered by plate 80 gives access to the fan. A control panel 81 for electrical equipment is mounted on the front wall 15 of the oven and a ventilated door panel 82 is arranged to give ready access to the burner 34.

The heat exchanger may be built with its own casing as a separate unit bolted to the side of the main oven cabinet and may be heated by gas, by oil or by electricity.

I claim:

1. An oven for heating or baking products by circulation of hot air having a top, bottom, back, front and two sides enclosing an oven space, two hollow members located in the oven space one on each side of a product heating space located centrally in the oven space, means for introducing heated air into said hollow members, said hollow members having openings discharging into said space, and means for moving said hollow members in endless paths so that the discharge openings also move in endless paths, said openings being so disposed as to cover substantially the whole side area of the product space during their movements, the openings in the two rotors facing each other on opposite sides of the products space.

2. An oven as claimed in claim 1, wherein several such openings are provided in each hollow member so that the endless paths cover substantially the whole area of the side of the product space.

3. An oven as claimed in claim 1, wherein the hollow members are hollow rotors so that the endless paths are circles.

4. An oven as claimed in claim 1, wherein the hollow members are rotors in the form of elongated boxes extending over a diameter of a circle.

5. An oven as claimed in claim 2 wherein the openings in the hollow member on one side of the products space are offset from those in the hollow member on the other side so that each part of the goods receives a current of air from one side followed by a current of air from the opposite side.

6. An oven as claimed in claim 2, wherein the hollow members are in the form of hollow rotors and the oven has air ducts which feed the heated air to the rotors one such duct being provided on each side of the product space on which the rotors are rotatably mounted, and a common chamber at the top of the oven to which the ducts are connected, which chamber has a hot air inlet.

7. An oven as claimed in claim 1, wherein each opening is provided with an adjustment member for adjusting the size of the opening.

8. An oven as claimed in claim 1, wherein each opening has lips directing the air at an angle of 70°—80° to the adjacent vertical plane.

9. An oven as claimed in claim 1 having a heat exchanger and means whereby hot air is withdrawn from the product space and is circulated through the heat exchanger back to said hollow members.

10. An oven as claimed in claim 9 wherein two flat chambers are provided, one above the other, at the upper part of the oven, one of which is connected with the hollow members to supply hot air thereto and the other of which receives hot air from the product space and is connected to the heat exchanger to discharge this air into the heat exchanger.

11. An oven as claimed in claim 1 wherein hot air is withdrawn from the product space by means including lower exit openings at the lower part of the product space and by four upper exit openings one adjacent each upper corner of the product space.

12. An oven as claimed in claim 11 having a duct that extends front to back of the floor of the oven the lower exit openings being at opposite ends of said duct and a vertical duct which connects the first-mentioned duct to the lower of said two chambers and into which said upper exit openings also open.

13. An oven as claimed in claim 3 wherein each rotor comprises a circular central part having radially disposed slotlike openings and two radial arms in line with each other, each having additional openings.

14. An oven for baking edible products comprising a chamber having door, a product space in said chamber, a hollow rotor at each side of the product space within the oven each said hollow rotor having a central hollow part and hollow arms extending out from the hollow central part, means for rotating the rotors about the axis of the hollow central part, heater means for heating air, means for conducting air from the product space to the heater means, means for conducting heated air from the heater means to the hollow rotors, openings in each said arms and in each said central part, said openings facing towards the product space and arranged to traverse approximately the whole area of the product space including the area of said central parts during rotation of the rotors so that hot air passes through the openings into the product space.

* * * * *